United States Patent
Ooki et al.

(10) Patent No.: US 10,578,779 B2
(45) Date of Patent: Mar. 3, 2020

(54) MICRO LENS ARRAY, OPTICAL WRITING DEVICE, AND IMAGE FORMING DEVICE

(71) Applicant: KONICA MINOLTA, INC., Chiyoda-ku, Tokyo (JP)

(72) Inventors: Makoto Ooki, Toyohashi (JP); Hideo Uemura, Hachioji (JP); Kazuki Ikeda, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/267,944

(22) Filed: Feb. 5, 2019

(65) Prior Publication Data
US 2019/0285779 A1  Sep. 19, 2019

(30) Foreign Application Priority Data
Mar. 15, 2018  (JP) .................................. 2018-047556

(51) Int. Cl.
*G03G 15/04* (2006.01)
*G02B 3/00* (2006.01)
*G03G 15/043* (2006.01)

(52) U.S. Cl.
CPC ....... *G02B 3/0056* (2013.01); *G03G 15/0435* (2013.01)

(58) Field of Classification Search
CPC ......... G03G 15/0435; G03G 15/04054; G03G 2215/0409; G02B 3/00; G02B 3/0056
See application file for complete search history.

(56) References Cited

U.S. PATENT DOCUMENTS

| | | | |
|---|---|---|---|
| 2011/0102661 A1* | 5/2011 | Oshitani | G02B 3/0006 348/335 |
| 2017/0261881 A1* | 9/2017 | Yamamura | G02B 3/0056 |
| 2018/0088256 A1* | 3/2018 | Yamamura | G03G 15/0435 |
| 2019/0094747 A1* | 3/2019 | Yamamura | G03G 15/04054 |

FOREIGN PATENT DOCUMENTS

| | | |
|---|---|---|
| JP | 2005148427 A | 6/2005 |
| JP | 2011118423 A | 6/2011 |

* cited by examiner

*Primary Examiner* — Sophia S Chen
(74) *Attorney, Agent, or Firm* — Buchanan Ingersoll & Rooney PC

(57) ABSTRACT

A micro lens array includes: a glass substrate; and a plurality of resin lenses arranged on at least one main surface of the glass substrate, wherein, among the plurality of lenses, resin lenses arranged on one main surface of the glass substrate are such that a plurality of lines of lenses arranged in a first direction is arranged side by side in a second direction different from the first direction, a core thickness, a radius of curvature, and a surface shape of a resin lens in a certain lens line are different from a core thickness, a radius of curvature, and a surface shape of a resin lens of another lens line, and the resin lenses have the same resin volume.

8 Claims, 8 Drawing Sheets

FIG. 7

| | RESIN LENS 211 | RESIN LENS 212 | RESIN LENS 213 |
|---|---|---|---|
| CONJUGATION LENGTH | 19.00 | 18.40 | 17.00 |
| CORE THICKNESS Ta | 0.53 | 0.70 | 1.00 |
| LENS SHAPE REGION φ | 2.64 | 2.00 | 1.40 |
| MULTIPLICATION VALUE | 1.40 | 1.40 | 1.40 |
| RATIO | 1.00 | 1.00 | 1.00 |

MICRO LENS ARRAY, OPTICAL WRITING DEVICE, AND IMAGE FORMING DEVICE

The entire disclosure of Japanese patent Application No. 2018-047556, filed on Mar. 15, 2018, is incorporated herein by reference in its entirety.

BACKGROUND

Technological Field

The present invention relates to a micro lens array, an optical writing device, and an image forming device, and especially relates to a technology of preventing image deterioration caused by distortion of the micro lens array.

Description of the Related Art

In an electrophotographic image forming device, there is one using a line optical type optical writing device as an optical writing device for forming an electrostatic latent image on a photoreceptor. The line optical type optical writing device forms an image of emission light of many light emitting elements on a photoreceptor by using a micro lens array.

This micro lens array is, for example, obtained by forming a number of resin lenses on a glass substrate. Since resin contracts when curing, when the glass substrate warps due to contraction of the resin, an image forming state on the photoreceptor changes, which might affect an image quality.

For example, as for warp in an out-of-plane direction of the glass substrate, a technology of forming resin lenses of the same shape on both surfaces of the glass substrate is proposed (refer to, for example, JP 2011-118423 A). In this manner, since a contraction force of the resin acting on the glass substrate is the same on both surfaces of the glass substrate, the warp may be prevented.

As for the warp of the glass substrate in an in-plane direction, in a case where the number of resin lenses is sufficiently large, it is possible to suppress the warp by randomly changing the shape of the resin lens (for example, refer to JP 2005-148427 A).

However, in the optical writing device in which light emitting elements are periodically arranged two-dimensionally, a distance from the light emitting element to the photoreceptor might be different between the light emitting elements. For example, in a case where a plurality of light emitting element lines extending in a main scanning direction is arranged side by side in a sub scanning direction, and a distance from the light emitting element to the photoreceptor differs for each light emitting element lines, if the resin lens lines as many as the light emitting element lines extending in the main scanning direction are arranged side by side in the sub scanning direction so as to correspond to the light emitting element lines, it is required that the resin lenses belonging to the same resin lens line have the same shape but the resin lenses belonging to different resin lens lines have different shapes.

In such a case, since it is not possible to make the shape of the resin lenses the same or randomly change the shape of the resin lens, the warp of the glass substrate cannot be suppressed by applying the above-described conventional technology.

When the warp in the in-plane direction occurs in the glass substrate, a positional relationship between the resin lenses changes and a positional relationship between the light emitting element and the resin lens corresponding to the light emitting element varies, so that an image forming performance varies for each resin lens. If the change in shape of the resin lens has periodicity, periodicity also appears in a change in density due to variation in image forming performance and is easily visually recognized, so that deterioration in image quality is inevitable.

SUMMARY

The present invention is achieved in view of the above-described problem, and an object thereof is to provide a micro lens array, an optical writing device, and an image forming device capable of suppressing image deterioration caused by distortion of the glass substrate.

To achieve the abovementioned object, according to an aspect of the present invention, a micro lens array reflecting one aspect of the present invention comprises: a glass substrate and a plurality of resin lenses arranged on at least one main surface of the glass substrate, wherein, among the plurality of lenses, resin lenses arranged on one main surface of the glass substrate are such that a plurality of lines of lenses arranged in a first direction is arranged side by side in a second direction different from the first direction, a core thickness, a radius of curvature, and a surface shape of a resin lens in a certain lens line are different from a core thickness, a radius of curvature, and a surface shape of a resin lens of another lens lie, and the resin lenses have the same resin volume.

BRIEF DESCRIPTION OF THE DRAWINGS

The advantages and features provided by one or more embodiments of the invention will become more fully understood from the detailed description given hereinbelow and the appended drawings winch are given by way of illustration only, and thus are not intended as a definition of the limits of the present invention:

FIG. 7 is a table illustrating a conjugation length, a core thickness, a lens shape region, a multiplication value of the core thickness and the lens shape region, and a ratio of the multiplication value for each resin lens.

DETAILED DESCRIPTION OF EMBODIMENTS

Hereinafter, one or more embodiments of a micro lens array, an optical writing device, and an image forming device according to the present invention will be described with reference to the drawings. However, the scope of the invention is not limited to the disclosed embodiments.

[1] Configuration of Image Forming Device

First, a configuration of an image forming device according to this embodiment is described.

Figure 1:
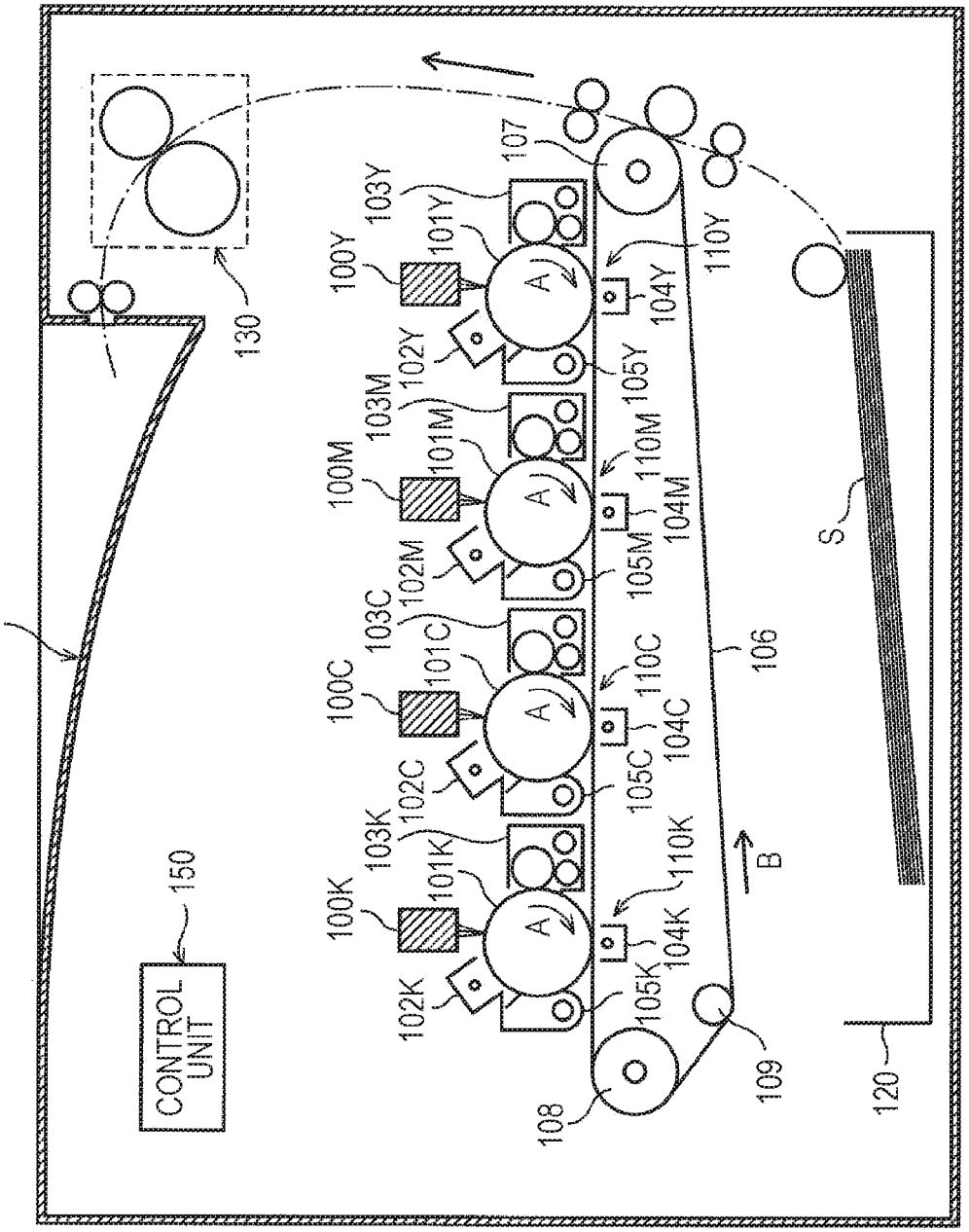
FIG. 1 is a view illustrating a principal configuration of an image forming device according to an embodiment of the present invention.

As illustrated in FIG. 1, an image forming device 1 is a so-called tandem type color printer provided with image forming units 110Y, 110M, 110C, and 110K which form toner images of yellow (Y), magenta (M), cyan (C), and black (K), respectively. The image forming units 110Y, 110M, 110C, and 110K include photoreceptor drums 101Y, 101M, 101C, and 101K which rotate in a direction of arrow A, respectively.

Charging devices 102Y, 102M, 102C, and 102K, optical writing devices 100Y, 100M, 100C, and 100K, developing devices 103Y, 103M, 103C, and 103K, primary transfer rollers 104Y, 104M, 104C, and 104K, and cleaning devices 105Y, 105M, 105C, and 105K are arranged around the photoreceptor drums 101Y, 101M, 101C, and 101K, respectively, around outer peripheral surfaces thereof.

The charging devices 102Y, 102M, 102C, and 102K uniformly charge the outer peripheral surfaces of the photoreceptor drums 101Y, 101M, 101C, and 101K, respectively. Optical writing devices 100Y, 100M, 100C, and 100K are so-called organic light emitting diode-print heads (OLED-PHs) which expose the outer peripheral surfaces of the photoreceptor drums 101Y, 101M, 101C, and 101K, respectively, to form electrostatic latent images.

The developing devices 103Y, 103M, 103C, and 103K supply toner of respective colors of Y, M, C, and K to develop the electrostatic latent images to form toner images of respective colors of Y, M, C, and K. The primary transfer rollers 104Y, 104M, 104C, and 104K electrostatically transfer the toner images carried by the photoreceptor drums 101Y, 101M, 101C, and 101K onto an intermediate transfer belt 106 (primary transfer).

The cleaning devices 105Y, 105M, 105C, and 105K eliminate charge and remove residual toner remained on the outer peripheral surfaces of the photoreceptor drums 101Y, 101M, 101C, and 101K after the primary transfer. Note that, in the following description, characters Y, M, C, and K are omitted when describing a configuration common to the image forming units 110Y, 110M, 110C, and 110K.

The intermediate transfer belt 106 is an endless belt stretched around secondary transfer roller pair 107 and driven rollers 108 and 109 and rotates to travel in a direction of arrow B. The toner images of respective colors of Y, M, C, and K are superimposed on one another to form a color toner image by the primary transfer along with this rotation travel. The intermediate transfer belt 106 rotates to travel in a state of carrying the color toner image to convey the color toner image to a secondary transfer nip of the secondary transfer roller pair 107.

Two rollers forming the secondary transfer roller pair 107 are pressed against each other to form the secondary transfer nip. A secondary transfer voltage is applied between the rollers. When a recording sheet S is supplied from a sheet feeder tray 120 at the same time with conveyance of the color toner image by the intermediate transfer belt 106, the color toner image is electrostatically transferred onto the recording sheet S at the secondary transfer nip (secondary transfer).

The recording sheet S is conveyed to a fixing device 130 in a state of carrying the color toner image and is discharged onto a discharge tray 140 after the color toner image is thermally fixed thereon.

The image forming device 1 is further provided with a control unit 150. Upon accepting a print job from an external device such as a personal computer (PC), the control unit 150 controls operation of the image forming device 1 to execute image formation.

[2] Configuration of Optical Writing Device 100

Next, a configuration of the optical writing device 100 is described.

The optical writing device 100 is provided with a micro lens array 200 and a light source substrate 230, the micro lens array 200 and the light source substrate 230 supported by a holder not illustrated so as to be at a predetermined distance from the photoreceptor drum 101.

Figure 3:
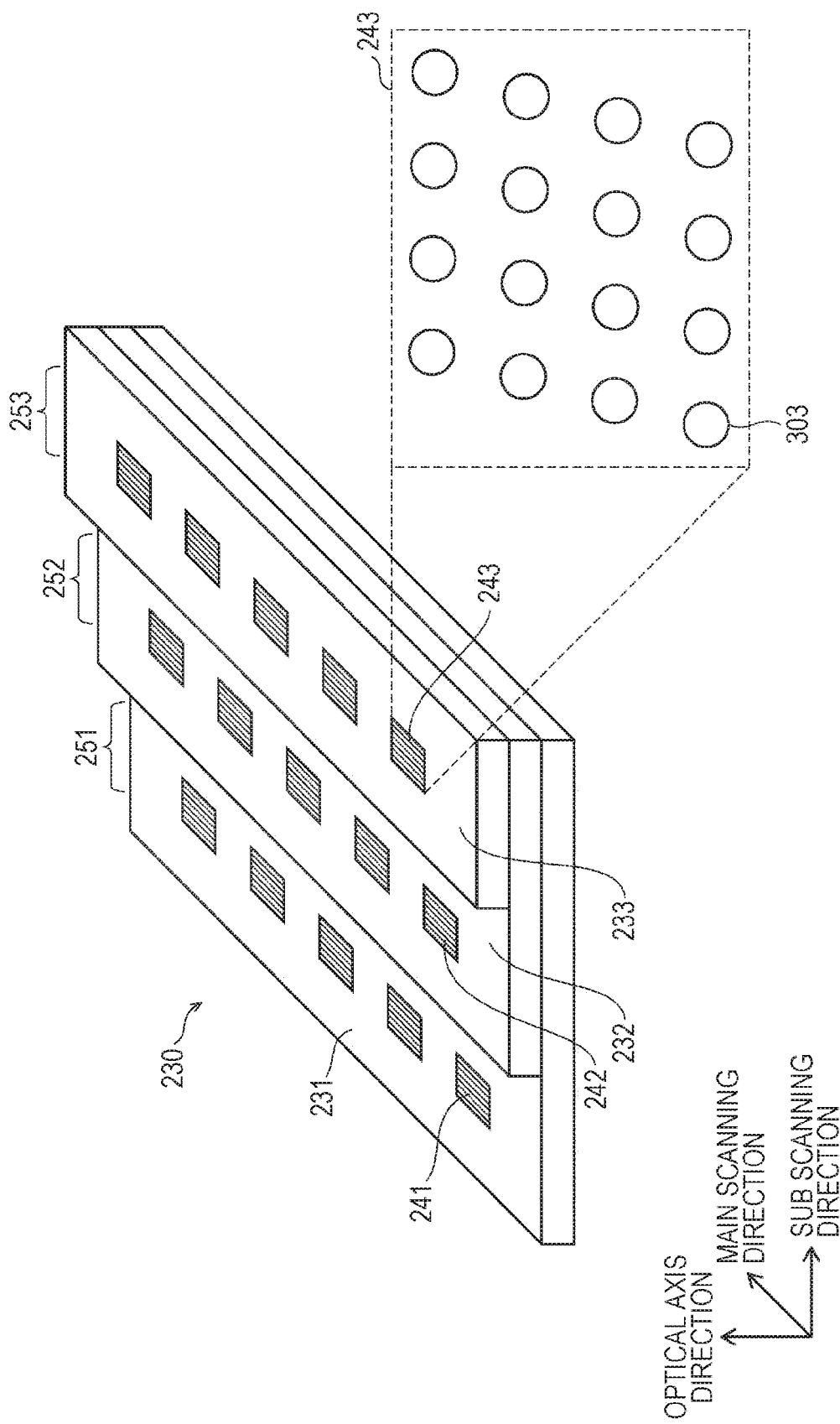
FIG. 3 is a view illustrating an appearance of a light source substrate and a principal configuration of a light emitting point group.

As illustrated in FIG. 3, the light source substrate 230 is obtained by stacking unit substrates 231, 232, and 233 in an optical axis direction, and light emitting point groups 241, 242, and 243 are arranged on the unit substrates 231, 232, and 233, respectively, in a main scanning direction to form light emitting point group lines 251, 252, and 253, respectively. The light emitting point group 243 is obtained by arranging light emitting points 303 in a staggered pattern, and the same applies to the light emitting point groups 241 and 242.

In this embodiment, an organic light emitting diode (OLED) is used as the light emitting point 303. Since the OLED may form a light emitting region in a planar shape, it is possible to set a beam diameter at an image forming point corresponding to the OLED by setting a multiplication value of an area of the light emitting region of the OLED and optical magnification. Therefore, there is an advantage that the beam diameter at the image forming point may be made uniform if the area and shape of the light emitting region of the OLED are optimized according to the optical magnification even in a case where the optical magnification must be changed for each light emitting point in design because of different conjugation lengths. Note that a light emitting element other than the OLED may be used as the light emitting point.

Generally, all of the light emitting points are arranged in the same plane, but the light emitting points are effectively arranged on a plurality of planes as in this embodiment in a case where it is not possible to arrange all the light emitting points on the same plane due to wiring restrictions on the light emitting substrate, manufacturing restrictions, spatial restrictions when arranging the light emitting substrate and the like.

In addition, since the light source substrate 230 is divided into the unit substrates 231, 232, and 233 for the light emitting point group lines 251, 252, and 253, respectively, the conjugation length may be individually adjusted for each of the unit substrates 231, 232, and 233. Accordingly, it is possible to individually correct errors occurring at the time of manufacture of the micro lens array 200 and the light source substrate 230 for each of the unit substrates 231, 232, and 233.

Also, not only the conjugation length but also errors in a shift component and an inclination component may be individually corrected for each of the unit substrates 231, 232, and 233. Therefore, deterioration in image quality caused by such errors may be suppressed, so that a high image quality may be realized.

In addition, the area of the light emitting point of the OLED is relatively large and a large number of OLEDs are arranged in an array, so that when the light source substrate 230 is formed as a single substrate, this becomes large. On the other hand, if a circuit such as wiring other than the OLED is arranged in a portion where a plurality of unit substrates 231, 232, and 233 is overlapped as described above, an area of the light source substrate 230 as seen in the optical axis direction may be reduced.

[3] Configuration of Micro Lens Array 200

Next, a configuration of the micro lens array 200 is described.

Figure 2:
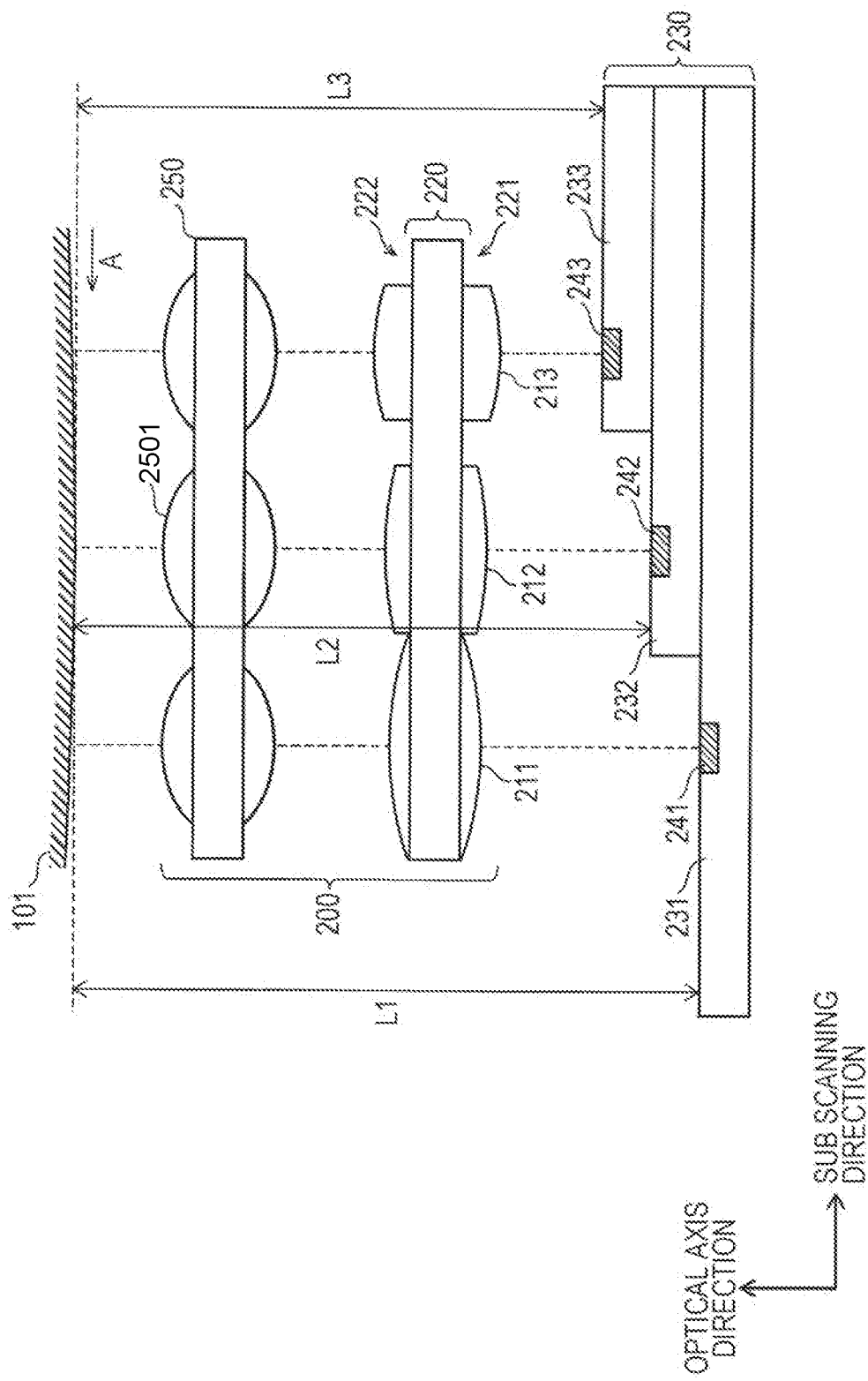
FIG. 2 is a view illustrating a principal configuration of an optical writing device.

As illustrated in FIG. 2, the micro lens array 200 is a telecentric optical system obtained by combining a lens array obtained by forming resin lenses 211, 212, and 213 on both surfaces of a glass substrate 220 and a lens array obtained by forming resin lenses 2501 on both surfaces of a glass substrate 250. The resin lenses 211, 212, and 213 make emission light of the light emitting point groups 241, 242, and 243, respectively, parallel and the resin lens 2501 forms an image of the parallel light on the outer peripheral surface of the photoreceptor drum 101.

Distances from the unit substrates 231, 232, and 233 to the glass substrate 220 are different from one another, but a distance from the glass substrate 250 to the photoreceptor drum 101 is constant irrespective of the resin lens 2501. Therefore, all the resin lenses 2501 have the same shape. Therefore, even when the resin lens 2501 contracts or expands, a contraction amount and an expansion amount are the same among the resin lenses, so that the glass substrate 250 does not warp. On the other hand, the resin lenses 211, 212, and 213 formed on the glass substrate 220 have shapes different from one another.

Figure 4:
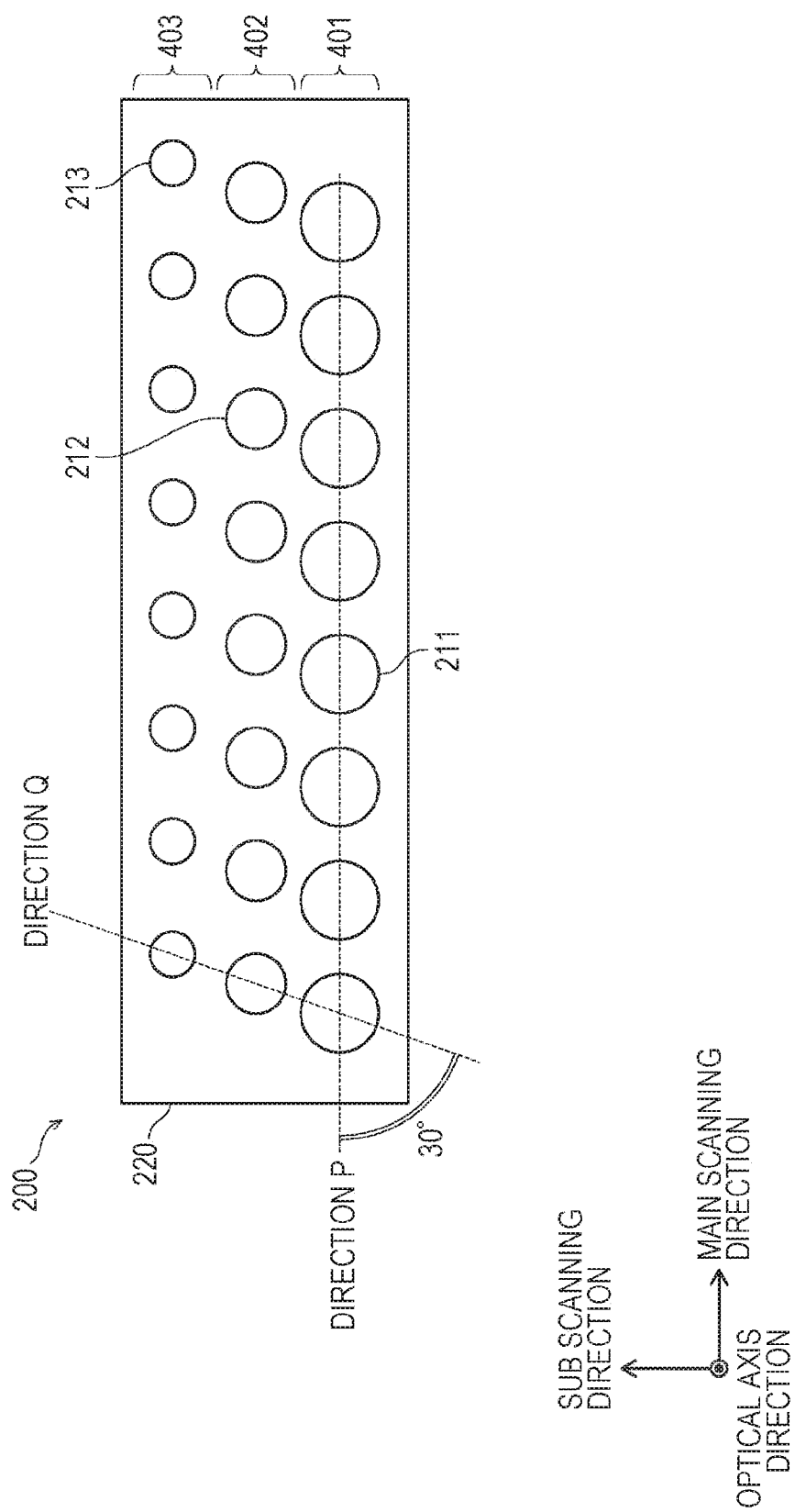
FIG. 4 is a plan view illustrating an arrangement of resin lenses in a micro lens array.

As illustrated in FIG. 4, the resin lenses 211, 212, and 213 are arranged in the main scanning direction to form resin lens lines 401, 402, and 403, respectively.

Figure 5:
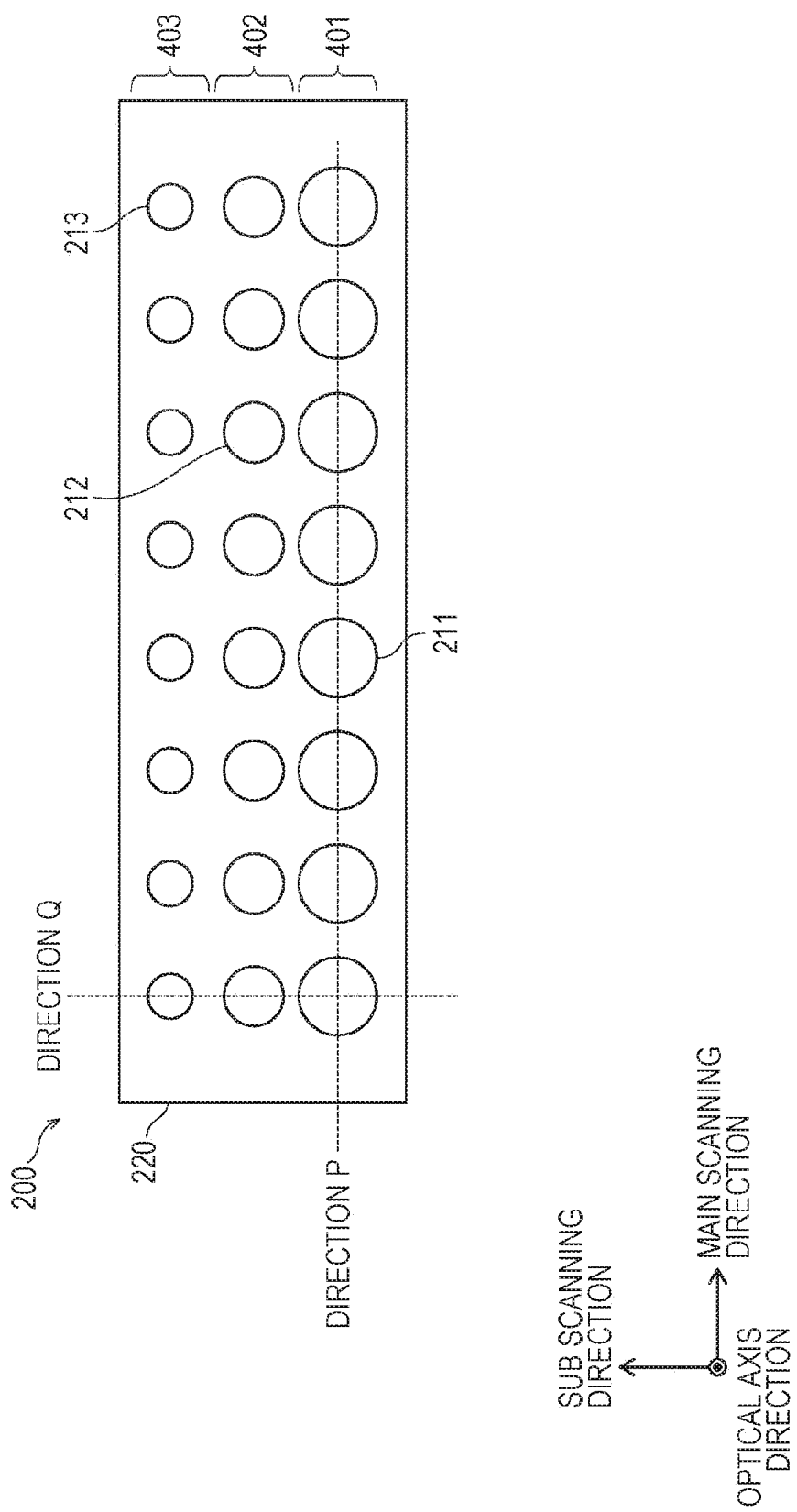
FIG. 5 is a plan view illustrating a variation of the arrangement of the resin lenses in the micro lens array.

The resin lens lines 401, 402, and 403 are arranged side by side in a sub scanning direction. Also, the resin lens lines 401, 402, and 403 are shifted from each other in the main scanning direction, and a direction Q connecting optical axis centers of the resin lenses 211, 212, and 213 on ends in the main scanning direction of the resin lens lines 401, 402, and 403 obliquely intersects with a direction P in which the resin lenses 211, 212, and 213 are arranged (main scanning direction). In FIG. 4, a case where an intersection angle between the directions P and Q is 30 degrees is illustrated; however, the intersection angle may be an angle other than 30 degrees such as 90 degrees (FIG. 5) as long as the directions P and Q are not parallel to each other.

Since the resin lens lines 401, 402, and 403 are formed on the unit substrates 231, 232, and 233 different from one another, distances (conjugation lengths) L1, L2, and L3 from the light emitting point groups 241, 242, and 243 to the outer peripheral surface of the photoreceptor drum 101 are different for each of the light emitting point group lines 251, 252, and 253. Therefore, core thicknesses, radii of curvature, and surface shapes of the resin lenses 211, 212, and 213 are also different for each of the resin lens lines 401, 402, and 403.

Figure 6:
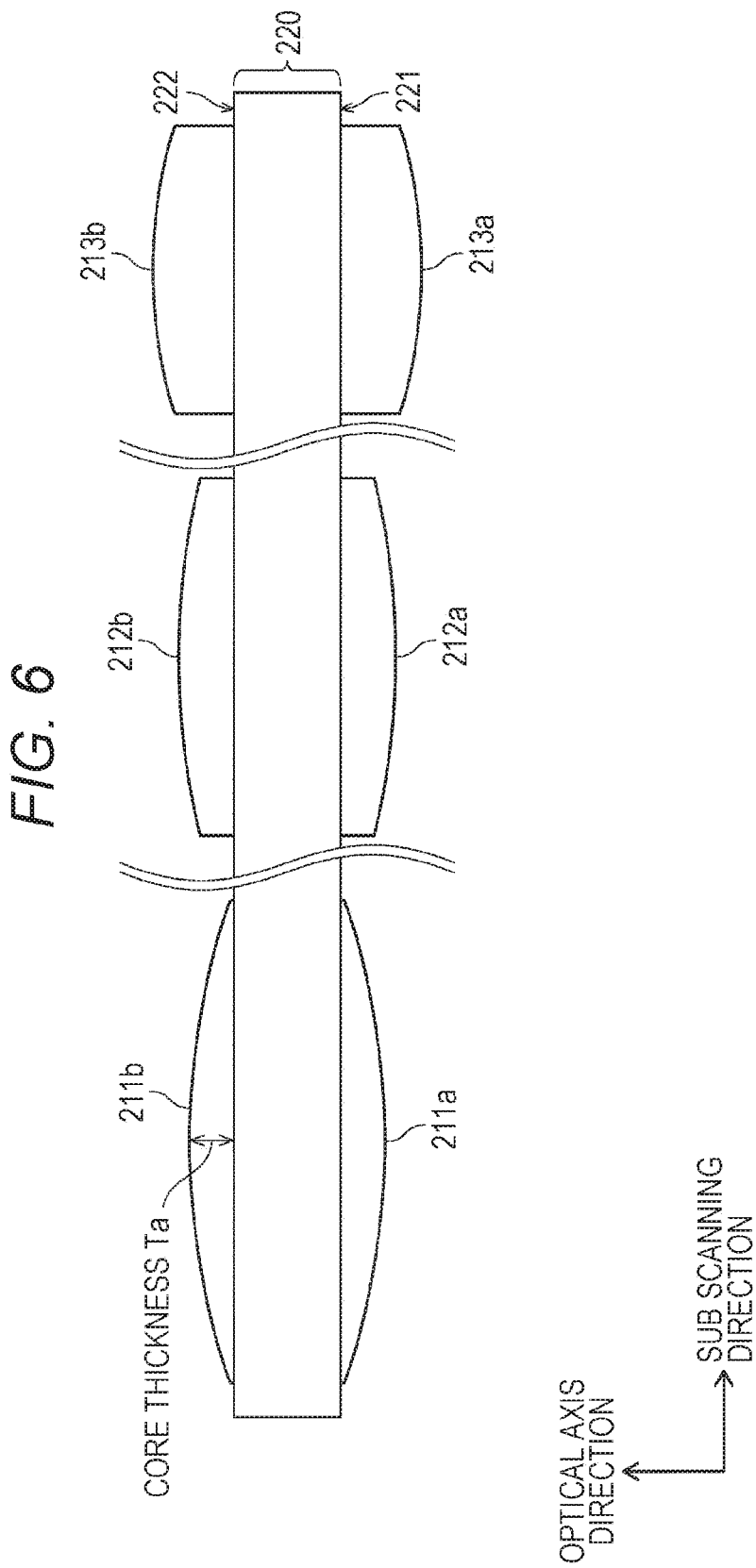
FIG. 6 is a view illustrating cross-sectional shapes of resin lenses.

However, the resin lenses 211, 212, and 213 have the same resin volume. Also, as illustrated in FIG. 6, the resin lenses 210, 211, and 213 are such that resin lens portions 211a, 212a, and 213a formed on a resin lens forming surface 221 of the glass substrate 220 and resin lens portions 211b, 212b, and 213b formed on corresponding positions on a resin lens forming surface 222 on a rear side of the glass substrate 220 have the same resin volume.

Among parameters of the resin lenses 211, 212, and 213, the parameters having a large effect on the resin volume are a core thickness Ta and a lens shape region φ. The core thickness Ta is the thickness of the resin lenses 211, 212, and 213 on an optical axis, and the lens shape region φ is an outer diameter of a region where the resin lens has a shape on the glass substrate.

In this embodiment, since the conjugation lengths are different for each of the resin lenses 211, 212, and 213, F numbers are different, and the lens shape regions φ are also different. Specifically, the longer the conjugation length, the larger the lens shape region φ, and the shorter the conjugation length, the smaller the lens shape region φ.

On the other hand, unlike the lens shape region φ, the core thickness Ta may be controlled in design to some extent in a range in which an optical characteristic of the micro lens array 200 is not affected. Therefore, if the resin lens having a large lens shape region φ has a small core thickness Ta and the resin lens having a small lens shape region φ has a large core thickness Ta, variation in cross-sectional area including the optical axis may be made smaller among the resin lenses 211, 212, and 213.

Since the square of a cross-sectional area ratio between the resin lenses is equal to a volume ratio, when the cross-sectional area ratio is brought close to one, the volume ratio approaches one and a difference in volume between the resin lenses is suppressed. In this embodiment, the cross-sectional area ratio of the resin lenses 211, 212, and 213 is substantially equal to the ratio of the multiplication value of the core thickness Ta and the lens shape region φ, so that the core thickness Ta is set such that the ratio of the multiplication value becomes one. In this manner, since a difference in resin volume among the resin lenses 211, 212, and 213 is minimized, an effect of suppressing distortion of the glass substrate 220 may be maximized.

FIG. 7 is a table illustrating the conjugation lengths L1, L2, and L3, the core thicknesses Ta and the lens shape regions φ of the resin lenses 211, 212, and 213 according to this embodiment. The table in FIG. 7 also illustrates the multiplication value of the core thickness Ta and the lens shape region φ, and a ratio of the multiplication value of each lens to the multiplication value of the resin lens 211 together. As illustrated in the table in FIG. 7, when the core thickness Ta is set according to the conjugation length and the lens shape region φ, the ratio of the multiplication value may be made one, so that the resin volumes of the resin lenses 211, 212, and 213 may be made the same. Therefore, it is possible to suppress the distortion of the glass substrate 220 and achieve an excellent image quality.

[4] Suppression of Warp of Glass Substrate 220

The resin lenses 211, 212, and 213 are formed by injection molding. Resin contracts during cooling and curing, and its contraction force is proportional to the volume of the resin. In a case where the resin volume of the resin lens formed on one resin lens forming surface is larger than the resin volume of the resin lens formed on the other resin lens forming surface, the contraction force of the resin lens formed on the one resin lens forming surface becomes larger than the contraction force of the resin lens formed on the other resin lens forming surface. As a result, the glass substrate 220 warps in an out-of-plane direction such that the one resin lens forming surface is recessed.

Also, when the resin volumes of the corresponding resin lens portions on the resin lens forming surfaces are the same, the contraction force acting on the glass substrate 220 is canceled out between the resin lens forming surfaces, so that the warp in the out-of-plane direction of the glass substrate 220 may be suppressed. However, in a case where the resin volumes are different between the resin lenses formed on the same resin lens forming surface, warp occurs in an in-plane direction of the glass substrate 220. Also, since the expansion amount caused by an increase in temperature is also proportional to the resin volume even after curing, the warp of the glass substrate 220 might occur in the same manner.

Therefore, if the resin volume is made the same among the resin lenses 211, 212, and 213 having different core thicknesses, radii of curvature, and surface shapes, distribution of the contraction amounts of the resin lenses 211, 212, and 213 at the time of curing and the expansion amounts of the resin lenses 211, 212, and 213 due to the increase in temperature becomes isotropic on the glass substrate. Therefore, deformation of the glass substrate 220 caused by deviation of the contraction amounts and expansion amounts becomes similar, so that it is possible to suppress the distortion of the glass substrate 220 and prevent image deterioration.

Note that, in a case where magnification, combining efficiency, and aberration of the optical system are different as a result of making the resin volume the same among the resin lenses 211, 212, and 213 having the different lens shapes due to the different conjugation lengths, the image quality may be improved by appropriately adjusting parameters of the light source such as an interval between the light emitting points and a light emitting amount.

[5] Variation

Although the present invention is described above with reference to the embodiment, it goes without saying that the present invention is not limited to the above-described embodiment and a following variation may also be implemented.

(5-1) In the above-described embodiment, a case where there are three light emitting point group lines and three resin lens lines is described as an example, but it goes without saying that the present invention is not limited to this, and instead, the following case is also possible.

Figure 8:
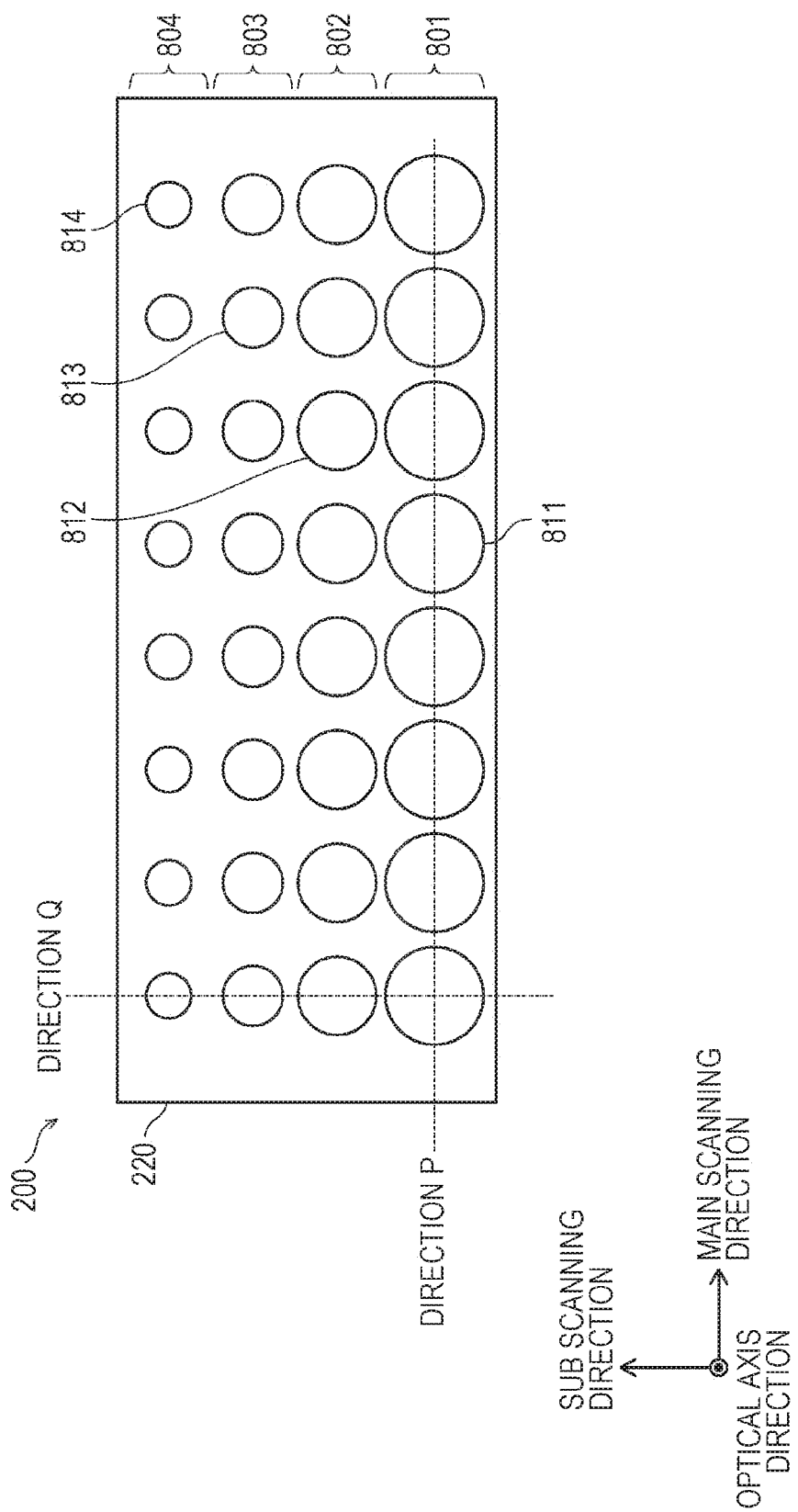
FIG. 8 is a plan view illustrating a variation of the arrangement of the resin lenses in the micro lens array.

For example, as illustrated in FIG. 8, four resin lens lines 801, 802, 803, and 804 may be provided on the glass substrate 220. The four resin lens lines 801, 802, 803, and 804 are obtained by arranging resin lenses 811, 812, 813, and 814 in the direction P, respectively, and the direction Q connecting optical axis centers of the resin lenses on one ends in the direction P is orthogonal to the direction P.

In this manner, even when the number of resin lens lines is other than three, it is possible to suppress the distortion of the micro lens array 200 by making the resin volume the same among the resin lenses.

(5-2) In the above-described embodiment, a case where the resin lenses are arranged on the both surfaces of the glass substrate 220 is described as an example, but it goes without saying that the present invention is not limited to this, and instead, the resin lens may be arranged only on one surface. In this case also, when the resin volume is made the same among the resin lenses, the warp in the in-plane direction of the glass substrate 220 may be suppressed.

(5-3) In the above-described embodiment, a case where a plurality of light emitting point group lines and a plurality of resin lens lines are arranged at equal intervals in the sub scanning direction is described as an example, but it goes without saying that the present invention is not limited thereto and the interval between a plurality of light emitting point group lines and a plurality of resin lens lines in the sub scanning direction need not be equal. It is desirable to set the intervals according to restricting conditions such as an installation position of the optical writing device 100 in the image forming device 1.

(5-4) In the above-described embodiment, a case where the conjugation lengths are different among the light emitting point group lines is described as an example, but it goes without saying that the present invention is not limited to this, and instead, the light emitting point group lines having the same conjugation length may be included. For example, in FIG. 3, the light emitting point group lines 251 and 252 are arranged on the different unit substrates 231 and 232, respectively, but instead, they may also be arranged on one unit substrate. In this manner, even in a case where dimensional restrictions of the optical writing device 100 in the optical axis direction are strict, the above-described effect may be obtained by applying the present invention.

(5-5) In the above-described embodiment, a case where one ends in the sub scanning direction of the unit substrates 231, 232, and 233 are retracted so as not to block the emission light of the light emitting point mounted on the unit substrate far from the photoreceptor drum 101 in the optical axis direction is described as an example, but it goes without saying that the present invention is not limited thereto, and instead, the following is also possible.

For example, a through hole may be formed on the unit substrate closer to the photoreceptor drum 101 in the optical axis direction than the unit substrate so as not to block the emission light of the light emitting point mounted on the unit substrate far from the photoreceptor drum 101 in the optical axis direction, or an optical path portion of the emission light may be made transparent. Since the light source substrate 230 may be made multi-layered also with such a configuration, the size of the light source substrate 230 in the sub scanning direction may be made compact. In addition, in such a configuration also, the similar effect may be obtained by applying the present invention.

(5-6) In the above-described embodiment, a case where the image forming device 1 is the tandem type color printer is described as an example, but it goes without saying that the present invention is not limited to this; this may be a color printer other than the tandem type or a monochrome printer. Even when the present invention is applied to a single-function device such as a copying device equipped with a scanner and a facsimile device having a facsimile communication function, or a multi-function peripheral (MFP) having both these functions, the similar effect may be obtained.

The micro lens array, the optical writing device, and the image forming device according to the present invention are useful as devices capable of preventing image deterioration caused by the distortion of the micro lens array.

Although embodiments of the present invention have been described and illustrated in detail, the disclosed embodiments are made for purposes of illustration and example only and not limitation. The scope of the present invention should be interpreted by terms of the appended claims.

What is claimed is:

1. A micro lens array comprising:
   a glass substrate; and
   a plurality of resin lenses arranged on at least one main surface of the glass substrate,
   wherein the plurality of resin lenses are arranged on the at least one main surface of the glass substrate in a plurality of lines of lenses arranged in a first direction,
   each of the lines of lenses is arranged side by side in a second direction different from the first direction,
   a core thickness, a radius of curvature, and a surface shape of the resin lenses in a certain one of the lens lines are different from a core thickness, a radius of curvature, and a surface shape of the resin lenses of another one of the lens lines, and
   the plurality of resin lenses have the same resin volume.

2. The micro lens array according to claim 1,
wherein the resin lenses of the plurality of resin lenses having a larger lens shape region have a smaller core thickness.

3. The micro lens array according to claim 1,
wherein a product of a lens shape region and a maximum core thickness is the same among the plurality of resin lenses.

4. The micro lens array according to claim 1,
wherein a first resin lens arranged on one main surface of the glass substrate and a second resin lens arranged in a position corresponding to the first resin lens on the other main surface have the same resin volume.

5. An optical writing device that exposes a photoreceptor to form an electrostatic latent image, comprising:
the micro lens array according to claim 1; and
a light source substrate on which a light emitting point is arranged in a position corresponding to each of the plurality of resin lenses,
wherein a distance from the light emitting point to the photoreceptor is the same for light emitting points having the same lens line to which the plurality of resin lenses corresponding to the light emitting point belong, and is different for light emitting points having different lens lines to which the plurality of resin lenses corresponding to the light emitting point belong.

6. The optical writing device according to claim 5,
wherein the light source substrate is formed by integrating a plurality of unit substrates in which the light emitting points are arranged in the first direction,
the resin lenses corresponding to the light emitting points arranged on the same unit substrate belong to the same lens line, and the resin lenses corresponding to the light emitting points arranged on different unit substrates belong to different lens lines.

7. The optical writing device according to claim 5,
wherein the light emitting point is an organic light emitting diode.

8. An image forming device comprising
the optical writing device according to claim 5.

* * * * *